United States Patent
Zhang et al.

(10) Patent No.: US 11,878,369 B1
(45) Date of Patent: Jan. 23, 2024

(54) LASER SCANNING WELDING METHOD FOR LAP JOINTS BASED ON LINEAR ENERGY DENSITY REGULATION

(71) Applicants: Chengrui Zhang, Jinan (CN); Yisheng Yin, Dalian (CN)

(72) Inventors: Chengrui Zhang, Jinan (CN); Yisheng Yin, Dalian (CN)

(73) Assignees: Chengrui Zhang, Jinan (CN); Yisheng Yin, Jinan (CN)

( * ) Notice: Subject to any disclaimer, the term of this patent is extended or adjusted under 35 U.S.C. 154(b) by 0 days.

(21) Appl. No.: 18/363,717

(22) Filed: Aug. 1, 2023

(30) Foreign Application Priority Data

Aug. 23, 2022 (CN) .......................... 202211017294.X

(51) Int. Cl.
*B23K 26/082* (2014.01)
*B23K 26/244* (2014.01)
*B23K 26/06* (2014.01)
*B23K 101/08* (2006.01)
*B23K 101/18* (2006.01)

(52) U.S. Cl.
CPC ........ *B23K 26/082* (2015.10); *B23K 26/0626* (2013.01); *B23K 26/244* (2015.10); *B23K 2101/18* (2018.08)

(58) Field of Classification Search
CPC ................ B23K 26/082; B23K 26/244; B23K 26/0626; B23K 2101/18
USPC ..................................... 219/121.64
See application file for complete search history.

(56) References Cited

FOREIGN PATENT DOCUMENTS

| CN | 110788486 | * | 2/2020 |
| CN | 213560528 | * | 6/2021 |

* cited by examiner

*Primary Examiner* — Dana Ross
*Assistant Examiner* — Joseph W Iskra

(57) ABSTRACT

A laser scanning welding method for lap joints based on linear energy density regulation includes the following steps 1 to 5. Step 1: welding surfaces of two metal plates of a same material are wiped with anhydrous ethanol; step 2: the two metal plates of a same material are placed in an overlapping manner on a welding operation platform; step 3: a position of a welding focus plane is adjusted; step 4: process parameters of laser scanning welding are set; step 5: parameters of a circular scanning power regulation strategy is calculated and power correction values for the lower plate is set; and step 6: lap welding of the two metal plates of the same material is completed by processing according to the circular scanning power regulation strategy and the power correction values.

10 Claims, 4 Drawing Sheets

LASER SCANNING WELDING METHOD FOR LAP JOINTS BASED ON LINEAR ENERGY DENSITY REGULATION

TECHNICAL FIELD

The disclosure relates to a field of a laser scanning welding technology, in particular to a laser scanning welding method for lap joints based on linear energy density regulation.

BACKGROUND

Laser scanning welding, known as laser stir welding, realizes a swing control of a focused beam by controlling a deflection of a galvanometer motor. Compared with general laser welding, on one hand, laser galvanometer scanning welding can effectively increase fluidity and a uniformity of a molten pool by stirring the molten pool, reduce a phenomenon of gas holes and splashing, on another hand, the laser galvanometer scanning welding can change a weld width by changing a stirring amplitude, which increases an adaptability of a welding gap and expands an application scenario of the laser welding, but an inherent nature of circular scanning leads to an uneven energy distribution in a direction perpendicular to a welding direction. Linear energy density is a size of a laser energy per unit length, which is used to describe an energy distribution in a length direction. The overall circular scanning shows a trend of low linear energy density in a weld center and high linear energy density at a weld edge, which leads to an unqualified weld penetration, further occurs welding defects meantime.

For lap welding, upper and lower plates are overlapped, and a contact surface between these two plates needs to be melted, and a new welding joint surface needs to be formed between the upper and lower plates. During a welding process, when the upper and lower plates are staggered and overlapped, thicknesses on two sides of the welding process are different, and defocus amounts are different. Therefore, it is necessary to handle a relationship between the energy distribution of the upper and lower plates and the defocus amount to prevent occurrence of welding defects such as an insufficient weld penetration or an excessive weld penetration that may cause burning through, as well as discontinuities in a penetration profile of a weld cross-section, and an absence of effective bonding surfaces between the upper and lower plates.

In existing laser beam welding methods for lap joints, a method of moving a center of a light spot is often used to suppress the quality defects. A size of the light spot is changed by adjusting the defocus amount to make the size of the light spot meet requirements of the weld width. Moving the center of the light spot to make it close to an upper plate is used to adjust an energy reception of the upper and lower plates. However, the method is sensitive to changes in a plate thickness and an installation position. In actual processing, a junction between the two plates is often prone to discontinuity in a melting contour, which increases the size of the light spot, resulting in a decrease in a power density and a thinner thickness of a processed plate.

For a problem of a high energy at an edge of a circular scanning weld seam, a solution of a Chinese patent document (application number CN202111661316.1, and publication number CN114192976A) adopts three-stage step power regulation to overcome the undercut defects. A power is set to a higher value when it is close to a middle position of a weld seam of two plates, and the power is set to a lower value when it is far away from the middle position of the weld seam, thereby to overcome the undercut defects generated on two sides of the weld seam.

However, from a perspective of a penetration profile of a weld cross-section, three-stage step powers are qualitatively set, and a formed lap weld penetration profile has large discontinuity and mutation, resulting in insufficient bonding size on one side of the weld cross-section, while penetration on another side of the weld cross-section is too deep, resulting in a burn through trend, which does not completely avoid the penetration quality defects prone to laser welding for the lap joints.

SUMMARY

1. Technical Problem to be Solved

The purpose of the disclosure is to solve the problem that the laser welding for lap joints is prone to have penetration quality defects in the related art, and to propose a laser scanning welding method for lap joints based on linear energy density regulation.

2. Technical Solutions

In order to achieve above objectives, the disclosure adopts the following technical solutions.

A laser scanning welding method for lap joints based on linear energy density regulation includes following steps:

step 1: wiping welding surfaces of two metal plates of a same material with anhydrous ethanol to remove surface oil stains and dust, ensuring that there is no gap between the two metal plates during overlap;

step 2: placing the two metal plates of the same material in an overlapping manner on a welding operation platform, and clamping the two metal plates with fixtures to ensure that relative positions of the two overlapping mental plates are fixed during a welding process;

step 3: adjusting a position of a welding focus plane to make a laser focal plane locate on an upper plate plane of the two overlapping metal plates and a deflecting angle of a scanning galvanometer be 5° to prevent a laser from reflecting and burning a laser head along an original direction;

step 4: setting process parameters of laser scanning welding;

step 5: calculating parameters of a circular scanning power regulation strategy and setting power correction values for a lower plate of the two overlapping metal plates;

step 6: processing according to the circular scanning power regulation strategy and the power correction values, and completing a lap welding of the two metal plates of the same material.

In an embodiment, the step 6 includes: melting, by a laser device, an overlapping part between the two overlapping mental plates, based on power regulation values for the upper plate plane obtained from the circular scanning power regulation strategy and the power correction values for the lower plate, to form a lap joint between the overlapping metal plates, thereby completing a fixation between the overlapping metal plates.

In an embodiment, the two metal plates in the step 1 have a same size and specification, and the surface oil stains are cleaned with the anhydrous ethanol to remove the surface oil stains and the dust before the welding process, ensuring that there is no other dirt between the two mental plates during the overlap.

In an embodiment, the overlapping manner of the two metal plates adopts a form of staggered stacking from top to bottom, and the fixtures are used to tighten the two mental plates.

In an embodiment, in the step 3, a six axis robot (i.e., six-degree robot) is used to adjust a height of the scanning galvanometer, the laser focal plane is located on the upper plate plane, and the lower plate is positively defocused; meanwhile, the scanning galvanometer is deflected to prevent the laser from reflecting and burning a laser device in the original direction after irradiation on a work piece; and the deflection angle is 5°, and a deflection direction is an opposite direction of the welding direction.

In an embodiment, the process parameters in the step 4 mainly include a scanning pattern, a scanning frequency, a scanning amplitude, a laser power, and a welding speed.

In an embodiment, the scanning pattern is a trajectory formed by a laser beam scanning through the scanning galvanometer; the scanning frequency is the number of cycles of the laser beam on the scanning pattern per unit time, and the unit of the scanning frequency is hertz (Hz); and the scanning amplitude is a maximum distance of the scanning pattern along the direction perpendicular to the welding direction, and for a circular scanning pattern, and when the scanning pattern is circle, the scanning amplitude is a diameter of a circle.

In an embodiment, the scanning pattern is circular.

In an embodiment, the parameters of the circular scanning power regulation strategy are determined by a method as follows.

A time interval t between adjacent power regulation positions is obtained through a formula (1) as follows:

$$t = \frac{1}{f \cdot N}. \tag{1}$$

In the formula (1), f is a scanning frequency of the scanning galvanometer, the scanning frequency is the number of cycles of a laser beam on a scanning pattern per unit time, and the scanning frequency is in Hz; and the N is the number of segments for segmented power regulation; it should be noted that power regulation values are different between different power regulation segments, but the power regulation values of same power regulation segments are the same, i.e., a precision of power regulation is limited by the number of segments N for the segmented power regulation. The higher the number of the segments, the higher the precision of the power regulation, therefore, a power regulation strategy needs to regulate the number of the segments N for the segmented power regulation.

$\theta_i$ is a central angle corresponding to an ith power regulation point (i.e., the ith power regulation position or the ith power regulation segment) of circular scanning. Main control information issued by an upper computer includes laser beam position information and laser device power information, and a value of $\theta_i$ is obtained through a formula (2) as follows:

$$\theta_i = \frac{360°}{N} \cdot i. \tag{2}$$

In the formula (2), within a same cycle, a value range of an issuing point i (i.e., the ith power regulation position or the ith power regulation segment) is related to the number of the segments N for the segmented power regulation, and a value range of i is obtained through a formula (3) as follows:

$$0 \leq i \leq N-1 \tag{3}.$$

After the value range of i is obtained from the formula (3), an increment $\Delta\theta$ of adjacent regulation section angles is obtained from the formula (2).

A projection distance of two adjacent power regulation positions of the scanning galvanometer along a direction perpendicular to a welding direction is $x_i$, as shown in FIG. 3, $x_i$ at different positions (i.e., the ith power regulation position) is obtained through a formula (4) as follows:

$$x_i = \frac{A}{2} \cdot |\sin(\theta_i + \Delta\theta) - \sin\theta_i|. \tag{4}$$

In the formula (4), A is the scanning amplitude, which is a maximum distance of the scanning pattern along a direction perpendicular to a welding direction. When the scanning pattern is a circle, the scanning amplitude A is a diameter of the circle.

Linear energy density of the laser beam is used to represent a magnitude of laser energy per unit length, and a unit of the linear energy density is joule per millimeter (J/mm). Linear energy density $w_i$ of the circular scanning on the direction perpendicular to the welding direction is obtained through a formula (5) as follows:

$$w_i = \frac{p_i \cdot t}{x_i}. \tag{5}$$

In the formula (5), $p_i$ is a power regulation value of the laser device on the ith power regulation segment, and t is the time interval between the adjacent power regulation positions, which is determined by the formula (1).

The formula (4) is substituted into the formula (5) to obtain a relationship among the linear energy density $w_i$, the central angle $\theta_i$, and the power regulation value $p_i$ of the circular scanning on an x-direction (i.e., on the x-axis) through a formula (6) as follows:

$$w_i = \frac{p_i \cdot t}{\frac{A}{2} \cdot |\sin(\theta_i + \Delta\theta) - \sin\theta_i|}. \tag{6}$$

A power regulation value $p_0$ of a first power regulation segment is taken as a reference power regulation value, based on a principle of a same energy density of different positions on an x-axis, a relationship between the power regulation value $p_0$ of the first power regulation segment and the power regulation value $p_i$ of another power regulation segment (i.e., the ith power regulation segment) is obtained through a formula (7) as follows:

$$\frac{p_0 \cdot t}{\frac{A}{2} \cdot |\sin(\theta_0 + \Delta\theta) - \sin\theta_0|} = \frac{p_i \cdot t}{\frac{A}{2} \cdot |\sin(\theta_i + \Delta\theta) - \sin\theta_i|}. \tag{7}$$

In the formula (7), the first power regulation segment serves as a starting segment, thereby $\theta_0=0°$ and $\sin\theta_0=0$. If the reference power regulation value $p_0$ is used to represent the power regulation value $p_i$ of each power regulation segment, then $p_i$ is obtained through a formula (8) as follows:

$$p_i = \frac{p_0 \cdot |\sin(\theta_i + \Delta\theta) - \sin\theta_i|}{\sin(\Delta\theta)}. \tag{8}$$

When power values of the laser scanning welding are not regulated, an input energy $E_0$ for each scanning cycle is through a formula (9) as follows:

$$E_0 = P \cdot T \tag{9}.$$

In the formula (9), P is an initial laser power of a process without regulation, and T is a scanning cycle of the scanning welding, which is obtained from the scanning frequency f, then T is obtained through a formula (10) as follows:

$$T = \frac{1}{f}. \tag{10}$$

Based on input energies remaining unchanged after the power values of the laser scanning welding are regulated and before the power values of the laser scanning welding are regulated, a formula (11) is obtained as follows:

$$P \cdot T = \sum_{i=0}^{N-1} p_i \cdot t. \tag{11}$$

The formulas (1), (8), and (10) are substituted into the formula (11) to obtain a regulated reference power regulation value $p_0$ through a formula (12) as follows:

$$p_0 = \frac{N \cdot P \cdot \sin(\Delta\theta)}{\sum_{i=0}^{N-1} |\sin(\theta_i + \Delta\theta) - \sin\theta_i|}. \tag{12}$$

In the formula (12), the number of the segments N for the segmented power regulation and the initial laser power P of the process without the regulation are both known or settable, thereby the reference power regulation value $p_0$ is obtained. Then, the power regulation values $p_i$ of each power regulation segment is obtained from the relationship between the reference power regulation value $p_0$ and the power regulation value $p_i$ in the formula (8).

After calculating the power regulation values $p_i$ of each position regulation point, in order to eliminate the defocus amount changes caused by plate thicknesses and the difference in laser beam spot areas, the reference power of the overlapping lower plate is further corrected to obtain the power regulation correction values of each position area of the lower plate, and finally the power regulation values of each position regulation point of the upper and lower plates are determined.

The disclosure further proposes a laser scanning welding device for lap joints based on linear energy density regulation, the welding operation platform of the laser scanning welding device includes a fiber laser, an industrial personal computer (IPC), and a scanning galvanometer; and output ends of the fiber laser and the IPC are connected to an input end of the scanning galvanometer.

3. Beneficial Effects

Compared to the related art, advantages of the disclosure are as follows.

(1) In the disclosure, to solve a problem of the penetration quality defects caused by an uneven distribution of the energy in a direction perpendicular to the welding direction during circle trajectory laser scanning welding, energy inputs at different positions on the circle trajectory are quantified based on the linear energy density, and the power at different positions on the trajectory is calculated according to principles that the input energy is consistent with that when not regulated and the district linear energy density at each position is equal. The disclosure realizes a spatial redistribution of the input energy, overcomes the problem of the penetration quality defects caused by the uneven distribution of the energy in the direction perpendicular to the welding direction during circular scanning welding, improves a continuity of a penetration contour curve, and reduces welding defects.

(2) In the disclosure, under a premise of ensuring the same linear energy density in each position area of the lower plate perpendicular to the welding direction, the lower plate power is further corrected to compensate for the defocus amount changes caused by the plate thicknesses and the differences in the laser beam spot areas.

(3) In the disclosure, a 36 segment power regulation method is adopted, by evenly dividing the circular scanning trajectory into 36 segments for mixed interpolation of motion position and laser power, an overall precision and real-time performance of energy regulation are improved, meeting requirements of power regulation based on the linear energy density.

DETAILED DESCRIPTION OF EMBODIMENTS

In the following, technical solutions in embodiments of the disclosure will be clearly and completely described in conjunction with accompanying drawings. Apparently, the described embodiments are only a part of embodiments of the disclosure, not all of the embodiments.

Embodiment 1

Referring to FIGS. 1-6, a laser scanning welding method for lap joints based on linear energy density regulation includes the following steps.

Step 1: welding surfaces of two 304 stainless steel plates with anhydrous ethanol are wiped to remove surface oil stains and dust, ensuring that there is no gap between the two 304 stainless steel plates during overlap.

In an embodiment, in the step 1, a size of the two 304 stainless steel plates used in the experiment is 200 millimeters (mm)*100 mm*2.8 mm, with chemical components:

carbon (C): ≤0.08%, silicon (Si): ≤1.0%, magnesium (Mn): ≤2.0%, chromium (Cr): 18.0%~20.0%, nickel (Ni): 8.0%~10.5%, sulfur (S): ≤0.03%, phosphorus (P): ≤0.035%, and nitrogen (N)≤0.1%. The two 304 stainless steels plates have a same size and specification, and the surface oil stains are cleaned with the anhydrous ethanol to remove the surface oil stains and the dust, ensuring that there is no other dirt between the two 304 stainless steel plates during the overlap.

Step 2: the two 304 stainless steel plates are placed in an overlapping manner on a welding operation platform, and the two 304 stainless steel plates are clamped with fixtures to ensure that relative positions of the two overlapping 304 stainless steel plates are fixed during a welding process.

Figure 1:
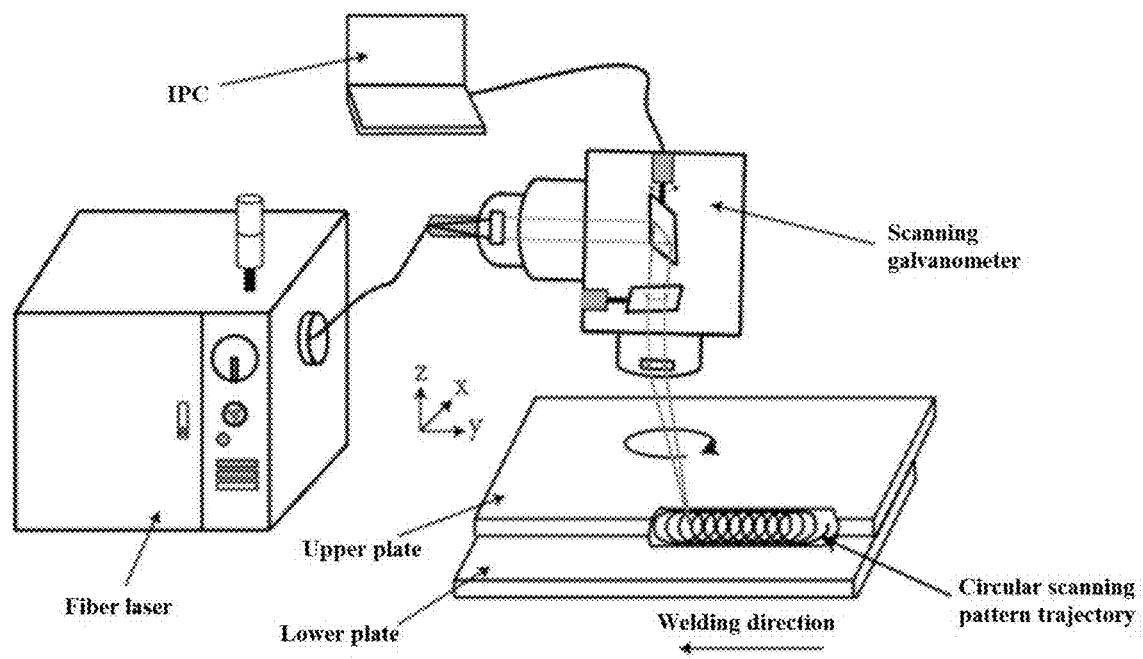
FIG. 1 is a schematic diagram of a laser scanning welding experimental platform of the disclosure.

In an embodiment, in the step 2, the overlapping manner of the two 304 stainless steel plates adopts a form of staggered stacking from top to bottom, with spatial positions shown in FIG. 1, and fixtures are used to tighten the two 304 stainless steel mental plates.

Step 3: a position of a welding focus plane is adjusted to make the laser focal plane locate on an upper plate plane of the two 304 stainless steel plates and a deflecting angle of a scanning galvanometer be 5° to prevent a laser from reflecting and burning a laser head along an original direction.

In an embodiment, a six axis robot is used to adjust a height of the scanning galvanometer, the laser focal plane is located on the upper plate, and a lower plate of the two 304 stainless steel plates is positively defocused. Meanwhile, the scanning galvanometer is deflected to prevent the laser from reflecting and burning a laser device in the original direction after irradiation on a work piece, and the deflection angle is 5°, and a deflection direction is an opposite direction of a welding direction.

Step 4: process parameters of the laser scanning welding are set.

Figure 2:
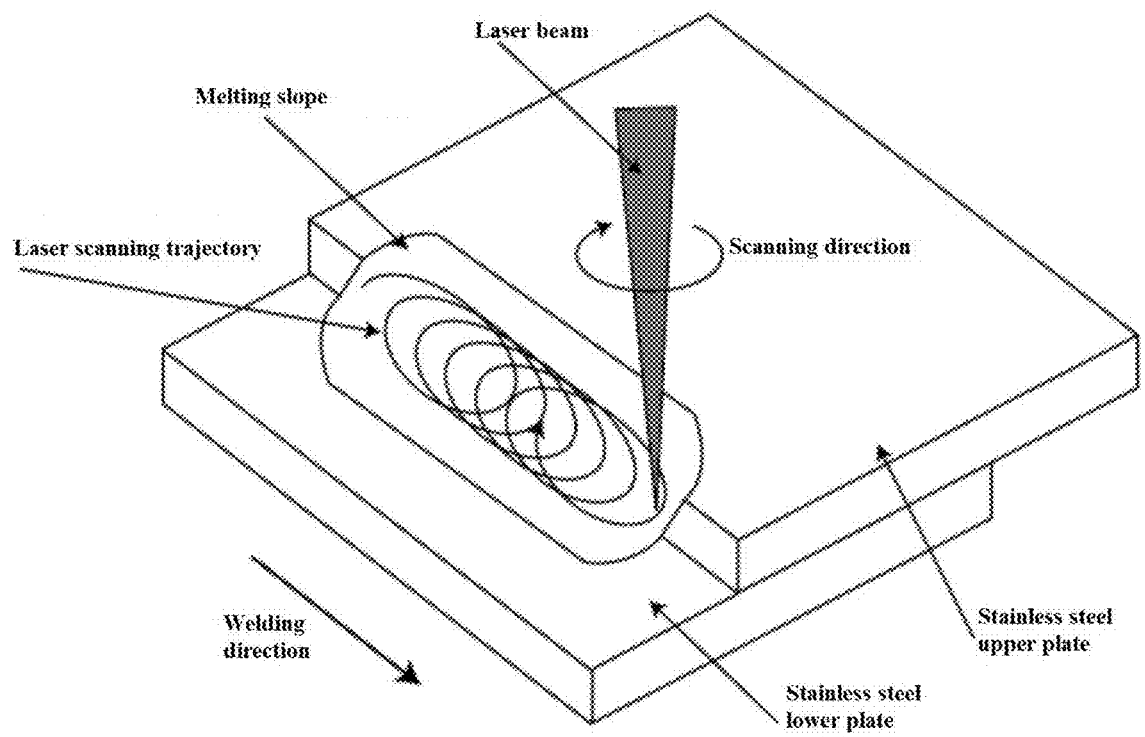
FIG. 2 is a schematic diagram of a laser scanning welding processing process of the disclosure.

In an embodiment, in the step 4, laser scanning refers to a rapid movement of a laser beam in a molten pool controlled by a deflection of a galvanometer during the processing, resembling the laser beam "stirring" the molten pool, further known as laser beam stirring welding. A schematic diagram of the scanning welding process is shown in FIG. 2, and main process parameters include a scanning pattern, a scanning frequency, a scanning amplitude, a laser power, and a welding speed. Among the main process parameters, the scanning pattern is a trajectory formed by the laser beam scanning through the scanning galvanometer; the scanning frequency is the number of cycles of the laser beam on the scanning pattern per unit time, and a unit of the scanning frequency is hertz (Hz); and the scanning amplitude is a maximum distance of the scanning pattern along a direction perpendicular to the welding direction, and for a circular scanning pattern, the scanning amplitude is a diameter of a circle. In the embodiment, the scanning pattern is circular, the scanning frequency is 30 Hz, the scanning amplitude is 3 mm, the initial laser power of the process is 2300 watts (W), and the platform movement speed is 8 millimeters per second (mm/s).

Step 5: parameters of a circular scanning power regulation strategy are calculated, and power correction values for the lower plate are set.

Each position of the circular scanning is issued at an equal angle, which means that an arc length of a light spot movement is equal during each issuance cycle. However, from a cross-section of a weld seam perpendicular to the welding direction, as shown by a small arrow value in FIG. 3, a distance of the light spot movement perpendicular to the welding direction is not equal within a same time, that is, a speed of the light spot movement along a direction perpendicular to the welding direction is not the same. A trend of the speed of the light spot movement perpendicular to the welding direction is that the speed from an overlap center to an overlap edge gradually decreases. It further leads to a variation in the linear energy density of the laser along a direction perpendicular to the welding direction. According to the formula (6), the linear energy density of the laser gradually increases from the overlap center to the overlap edge, while the linear energy density of the laser of the overlap center that needs to be connected is the lowest. On another hand, from a perspective of the lap joints, the focal plane is located on the upper plate, and defocus amounts and spot sizes of the upper plate and the lower plate are different. Therefore, it is necessary to make certain adjustments to a power of the lower plate.

Figure 4:
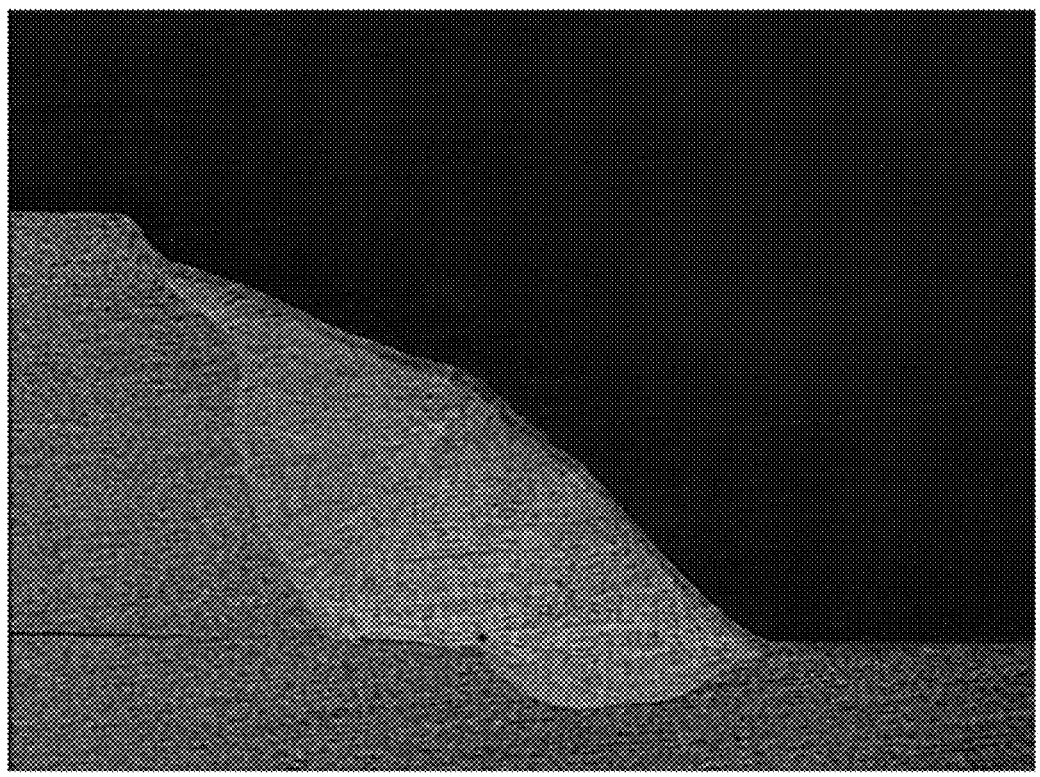
FIG. 4 is a schematic diagram of an unregulated cross-section of the weld seam of a circular scanning welding power of the disclosure.
Figure 5:
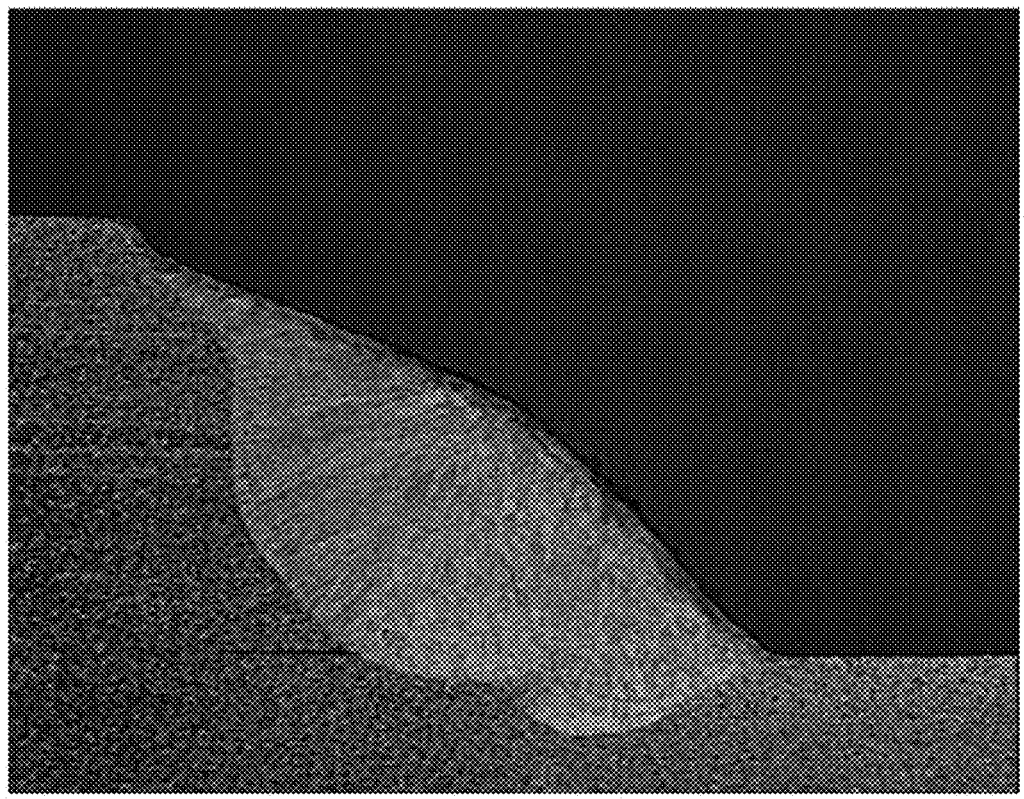
FIG. 5 is a schematic diagram of the cross-section of the weld seam after adjusting the circular scanning welding power of the disclosure.

When no power regulation is made, the power at each point is constant, and an initial laser power for the process is 2300 W. An overlapping section of the weld seam after processing is shown in FIG. 4. It is seen that without the power regulation, although a slope is formed on a surface of the weld seam, due to low energy density of a centerline of the circular scanning, a stable molten pool cannot be formed. There is insufficient penetration in some positions of the section of the weld seam, and an overall penetration profile has sudden changes. Some areas of the upper plate are not fully integrated with the lower plate, and there are air hole defects in the welded joint. Therefore, it is necessary to adjust the laser power for circular trajectory laser scanning welding based on a distribution of the linear energy density and the defocus amount. The cross-section of the weld seam after the power regulation of the circular trajectory laser scanning welding is shown in FIG. 5, and calculation steps for the power regulation method are as follows.

Figure 3:
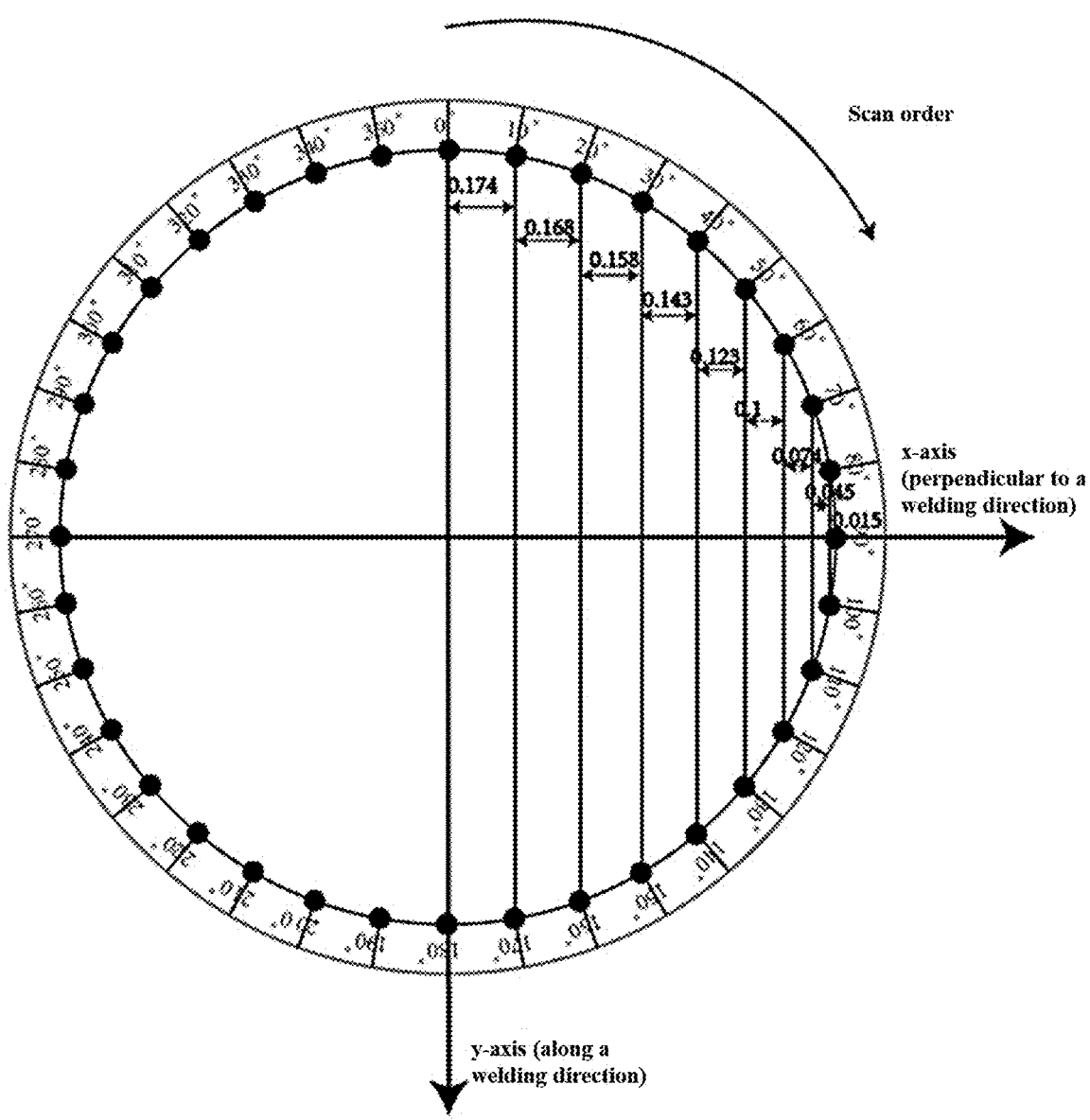
FIG. 3 is a schematic diagram of a circular scanning welding power regulation point of the disclosure.

In an embodiment, a scanning pattern is circular, a scanning direction is clockwise, and a starting point of the cyclic scanning is at 0° position shown in FIG. 3 (as shown in FIG. 3 for a welding direction, a direction perpendicular to the welding direction, an x-axis, and a y-axis). A scanning frequency is f=30 Hz, a scanning amplitude is A=3 mm, a radius of the scanning circle is $$R = \frac{A}{2} = 1.5 \text{ mm,}$$

a welding speed is $v_1$=8 mm/s, and the number of shots per cycle of the galvanometer is N=36.

A time interval t between adjacent power regulation positions is set through a formula (13) as follows:

$$t = \frac{1}{f \cdot N}. \tag{13}$$

$\theta_i$ is a central angle corresponding to an i th power regulation point of circular scanning; main control information issued by an upper computer includes laser beam position information and laser power information, and a value of $\theta_i$ is obtained through a formula (14) as follows:

$$\theta_i = \frac{360°}{N} \cdot i. \tag{14}$$

In the formula (14), within a same cycle, a value range of an issuing point i is related to the number of the segments N for the segmented power regulation, while the number of the segments N for segmented power regulation is 36 (i.e., N=36). Therefore, a range of the i is obtained through a formula (15) as follows:

$$0 \leq i \leq 35 \tag{15}$$

According to the formula (14), an increment of an angle of adjacent regulation segments is $\Delta\theta=10°$. It is noted that a power regulation value within a range of $0°$ to $10°$ of a circle in FIG. 3 is the power regulation value set when a center of the light spot is at a $0°$ position, that is, the power regulation value range set at $0°$ is $0°$ to $10°$ (excluding $10°$), the power value range set at $10°$ is $10°$ to $20°$ (excluding $20°$), and so on.

A projection distance of the two adjacent power regulation positions of the scanning galvanometer along a direction perpendicular to the welding direction is $x_i$, as shown in FIG. 3, and $x_i$ at different positions is obtained through a formula (16) as follows:

$$x_i = \frac{A}{2} \cdot |\sin(\theta_i + \Delta\theta) - \sin\theta_i|. \tag{16}$$

In the formula (16), the values of the i and $\theta_i$ are shown in the formulas (14) and (15), with scanning amplitude A=3 mm.

The linear energy density of the laser beam is used to represent a magnitude of laser energy per unit length, a unit of the linear energy density is joule per millimeter (J/mm). If the power regulation value of the laser on the ith power regulation segment is $p_i$, then linear energy density $w_i$ of the circular scanning in a x-direction shown in FIG. 3 is obtained through a formula (17) as follows:

$$w_i = \frac{p_i \cdot t}{x_i}. \tag{17}$$

The formula (16) is substituted into the formula (17) to obtain the relationship among the linear energy density $w_i$, the central angle $\theta_i$ and a power issued value (i.e. power regulation value) $p_i$ of the circular scanning in the x-direction (i.e., on the x-axis) through a formula (18) as follows:

$$w_i = \frac{p_i \cdot t}{\frac{A}{2} \cdot |\sin(\theta_i + \Delta\theta) - \sin\theta_i|}. \tag{18}$$

The power regulation value $p_0$ is taken at $0°$ as the reference power regulation value and based on a principle of same energy density of different positions on the x-axis, the relationship between $p_0$ and the power issued value $p_i$ between different points is obtained through a formula (19) as follows: the reference power regulation value $p_0$ and the power regulation value $p_i$ $$\frac{p_0 \cdot t}{\frac{A}{2} \cdot |\sin(10°) - \sin 0°|} = \frac{p_i \cdot t}{\frac{A}{2} \cdot |\sin(\theta_i + \Delta\theta) - \sin\theta_i|}. \tag{19}$$

The formula (19) is simplified, and the $p_0$ is used to represent the issued power $p_i$ at each point to obtain through a formula (20) as follows:

$$p_i = \frac{p_0 \cdot |\sin(\theta_i + \Delta\theta) - \sin\theta_i|}{\sin(10°)}. \tag{20}$$

When power values of the laser scanning welding are not regulated, an input energy $E_0$ is set through a formula (21) as follows:

$$E_0 = P \cdot T \tag{21}$$

In the formula (21), P is an initial set process power, and P=2300 W, and T is a scanning cycle of the scanning welding obtained through a formula (22) as follows:

$$T = \frac{1}{f}. \tag{22}$$

The scanning frequency is f=30 Hz, and T=0.333 s is obtained from the formula (10).

Based on input energies remaining unchanged after the power values of the laser scanning welding are regulated and before the power values of the laser scanning welding are regulated, a formula (23) is obtained as follows:

$$P \cdot T = \sum_{i=0}^{35} p_i \cdot t. \tag{23}$$

The formula (20) is substituted into the formula (23) to obtain the regulated reference power $p_0$ through a formula (24) as follows:

$$p_0 = \frac{P \cdot T \cdot \sin(10°)}{t \cdot \sum_{i=0}^{35} |\sin(\theta_i + \Delta\theta) - \sin\theta_i|}. \tag{24}$$

The numerical solution is substituted to obtain $p_0$=3594.5 W, and $p_0$ is rounded to obtain $p_0$=3600 W, and then the power regulation values $p_{18}$ to $p_{35}$ are obtained for each point on the upper plate ($180°$ to $350°$) based on the relationship between the reference power regulation value $p_0$ and the power regulation value $p_i$ in the formula (20).

Figure 6:
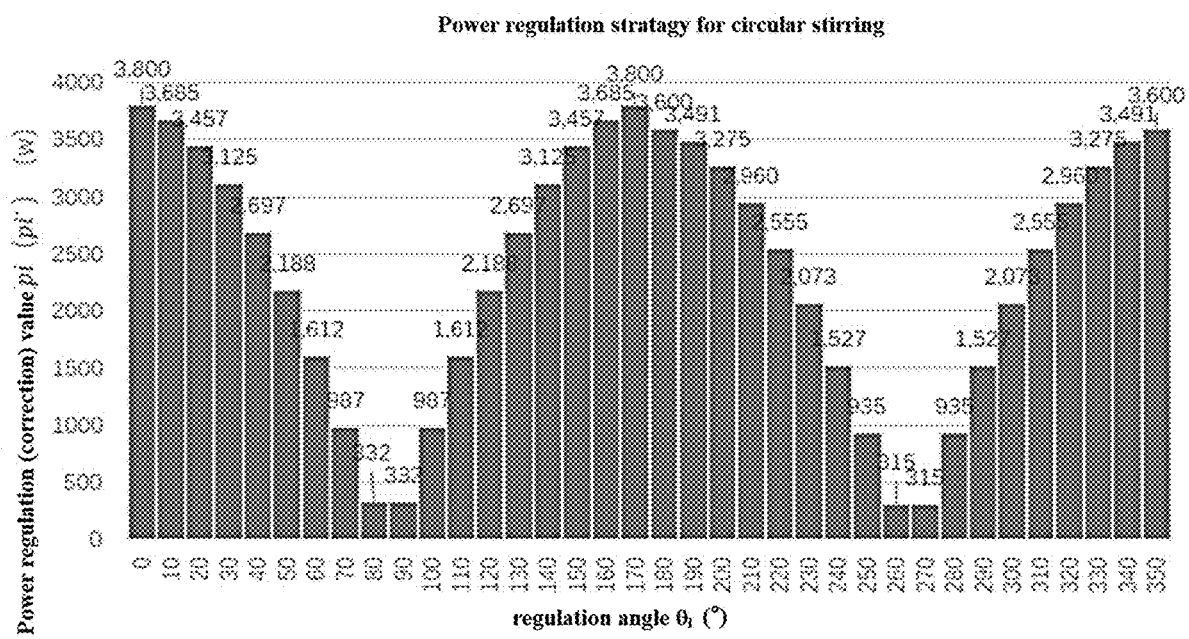
FIG. 6 is a schematic diagram of a circular scanning welding power control strategy diagram of the disclosure.

After the power regulation values $p_i$ of each position control point is calculated, in order to eliminate defocus amount changes caused by the plate thicknesses and the differences in laser beam spot areas, it is necessary to further modify and optimize the power values of the overlapping lower plate. The reference power $p_0'$ of the lower plate is set to 3800 W, to ensure that the linear energy density at different positions of the lower plate is the same after a correction, the power regulation correction values $p_0'$ to $p_{17}'$ of each point ($0°$ to $170°$) of the lower plate are obtained from the formula (20), and the power regulation values $p_{18}$ to $p_{35}$ and $p_0'$ to $p_{17}'$ of all power control points in this embodiment have been calculated. The power regulation values $p_{18}$ to $p_{35}$ of each point on the upper plate and the power regulation correction values $p_0'$ to $p_{17}'$ of each point on the lower plate are shown in FIG. 6. In addition, considering a minimum output power of the laser, the four points $p_8$, $p_9$, $p_{26}'$, and $p_{27}'$ below the minimum output power of the laser in $p_{18}$ to $p_{35}$ and $p_0'$ to $p_{17}'$ are actually not emitting light.

Step 6: lap welding of the two 304 stainless steel plates metal plates of the same material is completed by processing according to the set circular scanning power regulation strategy and the power correction values.

After conducting wire cutting sampling, inlaying, grinding, and surface corrosion on the lap joints before and after regulation, it was photographed using an image measuring instrument. The unregulated cross-section of the weld seam is shown in FIG. 4, while the regulated cross-section of the weld seam is shown in FIG. 5. It is seen that there are no macroscopic defects such as air holes or cracks found in the lap joints. An overall quality of joints is relatively high, and compared to FIG. 4 without power regulation, welding defects such as the air holes are reduced. A continuity of a penetration contour curve and a penetration of key positions are good, and a quality of a bonding surface is significantly improved.

In the disclosure, to solve a problem of the penetration quality defects caused by an uneven distribution of the energy in a direction perpendicular to the welding direction during circle trajectory laser scanning welding, energy inputs at different positions on the circle trajectory are quantified based on the linear energy density, and the power at different positions on the trajectory is calculated according to principles that the input energy is consistent with that when not regulated and the district linear energy density at each position is equal. The disclosure realizes a spatial redistribution of the input energy, overcomes the problem of the penetration quality defects caused by the uneven distribution of the energy in the direction perpendicular to the welding direction during circular scanning welding, improves a continuity of a penetration contour curve, and reduces welding defects.

In the disclosure, under a premise of ensuring the same linear energy density in each position area of the lower plate perpendicular to the welding direction, the lower plate power is further corrected to compensate for the defocus amount changes caused by the plate thicknesses and the differences in the laser beam spot areas.

In the disclosure, a 36 segment power regulation method is adopted, by evenly dividing the circular scanning trajectory into 36 segments for mixed interpolation of motion position and laser power, an overall precision and real-time performance of energy regulation are improved, meeting requirements of power regulation based on the linear energy density.

The above-described embodiments are only a description of the illustrated method of the disclosure, not a limitation of the scope of the disclosure. Without departing from a spirit of a design of the disclosure, various modifications and changes made by those skilled in the art to the technical solution of the disclosure shall fall within the scope of the protection determined by the claims of the disclosure.

What is claimed is:

1. A laser scanning welding method for lap joints based on linear energy density regulation comprises:
   step 1: wiping welding surfaces of two metal plates of a same material with anhydrous ethanol to remove surface oil stains and dust, ensuring that there is no gap between the two metal plates during overlap;
   step 2: placing the two metal plates of the same material in an overlapping manner on a welding operation platform, and clamping the two metal plates with fixtures to ensure that relative positions of the two overlapping mental plates are fixed during a welding process;
   step 3: adjusting a position of a welding focus plane to make a laser focal plane locate on an upper plate plane of the two overlapping metal plates and a deflecting angle of a scanning galvanometer be 5° to prevent a laser from reflecting and burning a laser head along an original direction;
   step 4: setting process parameters of laser scanning welding;
   step 5: calculating parameters of a circular scanning power regulation strategy and setting power correction values for a lower plate of the two overlapping metal plates, wherein the parameters of the circular scanning power regulation strategy are determined by a method as follows:
   obtaining a time interval t between adjacent power regulation positions through a formula (1) as follows:

$$t = \frac{1}{f \cdot N}; \tag{1}$$

wherein, in the formula (1), f is a scanning frequency of the scanning galvanometer, the scanning frequency is the number of cycles of a laser beam on a scanning pattern per unit time, and a unit of the scanning frequency is hertz (Hz); and N is the number of segments for segmented power regulation, power regulation values are different between different power regulation segments, and power regulation values of same power regulation segments are the same, i.e., a precision of power regulation is limited by the number of segments N for the segmented power regulation, the higher the number of the segments, the higher the precision of the power regulation, therefore, a power regulation strategy is adjusted according to the number of the segments N for the segmented power regulation;
   obtaining a central angle $\theta_i$ corresponding to an ith power regulation position of circular scanning;
   wherein main control information issued by an upper computer comprises laser beam position information and laser device power information, and a value of $\theta_i$ is obtained through a formula (2) as follows:

$$\theta_i = \frac{360°}{N} \cdot j; \tag{2}$$

in the formula (2), within a same cycle, a value range of i is related to the number of the segments N for the segmented power regulation, and the value range of i is obtained through a formula (3) as follows:

$$0 \leq i \leq N-1 \tag{3};$$

after obtaining the value range of i from the formula (3), obtaining an angle increment $\Delta\theta$ of the adjacent power regulation positions through the formula (2);
   obtaining a projection distance $x_i$ of the adjacent power regulation positions of the scanning galvanometer along a direction perpendicular to a welding direction, wherein $x_i$ at the ith power regulation position is obtained through a formula (4) as follows:

$$x_i = \frac{A}{2} \cdot |\sin(\theta_i + \Delta\theta) - \sin\theta_i|; \tag{4}$$

in the formula (4), A is a scanning amplitude, which is a maximum distance of the scanning pattern along the direction perpendicular to the welding direction; when the scanning pattern is a circle, the scanning amplitude A is a diameter of the circle;

using linear energy density of the laser beam to represent a magnitude of laser energy per unit length with a unit of the linear energy density being joule per millimeter (J/mm); and obtaining linear energy density $w_i$ of the circular scanning on the direction perpendicular to the welding direction through a formula (5) as follows:

$$w_i = \frac{p_i \cdot t}{x_i}; \qquad (5)$$

wherein, in the formula (5), $p_i$ is a power regulation value of a laser device on the ith power regulation position, and t is the time interval between the adjacent power regulation positions, which is determined by the formula (1);

substituting the formula (4) into the formula (5) to obtain a relationship among the linear energy density $w_i$, the central angle $\theta_i$, and the power regulation value $p_i$ of the circular scanning on an x-axis through a formula (6) as follows:

$$w_i = \frac{p_i \cdot t}{\frac{A}{2} \cdot |\sin(\theta_i + \Delta\theta) - \sin\theta_i|}; \qquad (6)$$

taking a power regulation value $p_0$ of a first power regulation position as a reference power regulation value, and obtaining, based on a principle of same linear energy density of different power regulation positions on the x-axis, a relationship between the power regulation value $p_0$ of the first power regulation position and the power regulation value $p_i$ of the ith power regulation position through a formula (7) as follows:

$$\frac{p_0 \cdot t}{\frac{A}{2} \cdot |\sin(\theta_0 + \Delta\theta) - \sin\theta_0|} = \frac{p_i \cdot t}{\frac{A}{2} \cdot |\sin(\theta_i + \Delta\theta) - \sin\theta_i|}; \qquad (7)$$

wherein, in the formula (7), the first power regulation position serves as a starting position, thereby $\theta_0 = 0°$ and $\sin\theta_0 = 0$;

using the reference power regulation value $p_0$ to represent the power regulation value $p_i$ of the ith power regulation position, and obtaining the power regulation value $p_i$ through a formula (8) as follows:

$$p_i = \frac{p_0 |\sin(\theta_i + \Delta\theta) - \sin\theta_i|}{\sin(\Delta\theta)}; \qquad (8)$$

when power values of the laser scanning welding are not regulated, obtaining an input energy $E_0$ for each scanning cycle through a formula (9) as follows:

$$E_0 = P \cdot T \qquad (9);$$

wherein, in the formula (9), P is an initial laser power when the power values of the laser scanning welding are not regulated, and T is a scanning cycle of the scanning welding, which is obtained from the scanning frequency f, then T is obtained through a formula (10) as follows:

$$T = \frac{1}{f}; \qquad (10)$$

based on input energies remaining unchanged after the power values of the laser scanning welding are regulated and before the power values of the laser scanning welding are regulated, a formula (11) is obtained as follows:

$$P \cdot T = \sum_{i=0}^{N-1} p_i \cdot t; \qquad (11)$$

substituting the formulas (1), (8), and (10) into the formula (11) to obtain the reference power regulation value $p_0$ through a formula (12) as follows:

$$p_0 = \frac{N \cdot P \cdot \sin(\Delta\theta)}{\sum_{i=0}^{N-1} |\sin(\theta_i + \Delta\theta) - \sin\theta_i|}; \text{ and} \qquad (12)$$

wherein, in the formula (12), the number of the segments N for the segmented power regulation and the initial laser power P of the process without the regulation are both known or settable, thereby the reference power regulation value $p_0$ is obtained; then, the power regulation value $p_i$ of the ith power regulation position is obtained from the relationship between the reference power regulation value $p_0$ and the power regulation value $p_i$ in the formula (8); and step 6: processing according to the circular scanning power regulation strategy and the power correction values, and completing a lap welding of the two metal plates of the same material.

2. The laser scanning welding method for lap joints based on linear energy density regulation as claimed in claim 1, wherein the two metal plates in the step 1 have a same size and specification, and the surface oil stains are cleaned with the anhydrous ethanol to remove the surface oil stains and the dust before the welding process, ensuring that there is no other dirt between the two mental plates during the overlap.

3. The laser scanning welding method for lap joints based on linear energy density regulation as claimed in claim 1, wherein the overlapping manner of the two metal plates adopts a form of staggered stacking from top to bottom, and the fixtures are used to tighten the two mental plates.

4. The laser scanning welding method for lap joints based on linear energy density regulation as claimed in claim 1, wherein in the step 3, a six axis robot is used to adjust a height of the scanning galvanometer, the laser focal plane is located on the upper plate plane, and the lower plate is positively defocused; the scanning galvanometer is deflected to prevent the laser from reflecting and burning the laser device in the original direction after irradiation on a work piece; and the deflection angle is 5°, and a deflection direction is an opposite direction of the welding direction.

5. The laser scanning welding method for lap joints based on linear energy density regulation as claimed in claim 1, wherein the process parameters in the step 4 comprise the scanning pattern, the scanning frequency, the scanning amplitude, a laser power, and a welding speed.

6. The laser scanning welding method for lap joints based on linear energy density regulation as claimed in claim 1, wherein the parameters of the circular scanning power regulation strategy comprise: powers at different power regulation positions on a circular scanning trajectory calculated by quantifying energy inputs at the different power regulation positions on the circular scanning trajectory based on the linear energy density and according to principles that the input energy when the power values of the laser scanning welding are regulated is consistent with the input energy when the power values of the laser scanning welding are not regulated and the linear energy density at the different power regulation positions along the direction perpendicular to the welding direction is equal, thereby achieving a spatial redistribution of input energy.

7. The laser scanning welding method for lap joints based on linear energy density regulation as claimed in claim 1, wherein the setting power correction values for a lower plate, comprises: correcting power of the lower plate to compensate for changes of defocus amounts caused by plate thicknesses and differences in laser beam spot areas, while ensuring that each position area perpendicular to the welding direction of the lower plate has the same linear energy density.

8. The laser scanning welding method for lap joints based on linear energy density regulation as claimed in claim 5, wherein the scanning pattern is a trajectory formed by the laser beam scanning through the scanning galvanometer; the scanning frequency is the number of cycles of the laser beam on the scanning pattern per unit time, and the unit of the scanning frequency is Hz; and the scanning amplitude is the maximum distance of the scanning pattern along the direction perpendicular to the welding direction, and when the scanning pattern is circle, the scanning amplitude is the diameter of the circle.

9. The laser scanning welding method for lap joints based on linear energy density regulation as claimed in claim 8, wherein the scanning pattern is the circle.

10. The laser scanning welding method for lap joints based on linear energy density regulation as claimed in claim 1, wherein the welding operation platform is provided with a fiber laser, an industrial personal computer (IPC), and a scanning galvanometer, and output ends of the fiber laser and the IPC are connected to an input end of the scanning galvanometer.

* * * * *